United States Patent [19]

Takeshima et al.

[11] Patent Number: 4,789,041

[45] Date of Patent: Dec. 6, 1988

[54] CONTROL DEVICE FOR POWER STEERING APPARATUS

[75] Inventors: Sadao Takeshima; Hideo Yabe, both of Higashimatsuyama, Japan

[73] Assignee: Jidosha Kiki Co., Ltd., Tokyo, Japan

[21] Appl. No.: 132,729

[22] Filed: Dec. 11, 1987

Related U.S. Application Data

[63] Continuation of Ser. No. 867,834, May 27, 1986, abandoned.

[30] Foreign Application Priority Data

Jul. 4, 1985 [JP] Japan .......................... 60-101182[U]

[51] Int. Cl.$^4$ .............................................. B62D 5/06
[52] U.S. Cl. .................................. 180/142; 364/424.05
[58] Field of Search ................... 180/141, 142, 79.1, 180/132, 143; 364/424; 74/388 PS

[56] References Cited

U.S. PATENT DOCUMENTS 4,473,128 9/1984 Nakayama ........................ 180/142
4,476,529 10/1984 Nakamura ........................ 180/142
4,619,338 10/1986 Higashi ............................ 180/79.1
4,624,335 11/1986 Shiraishi ........................... 180/142

Primary Examiner—David M. Mitchell
Assistant Examiner—Everett G. Diederiks
Attorney, Agent, or Firm—Townsend and Townsend

[57] ABSTRACT

A control device for a power steering apparatus includes a vehicle speed signal generator, a steering angle signal generating circuit, a first pattern memory, a second pattern memory, and a drive circuit. The vehicle speed signal generating circuit generates a vehicle speed signal corresponding to an actual vehicle speed. The steering angle signal generator detects a steering angle and generates a steering angle signal. The first pattern memory generates a power steering signal determined in correspondence with the vehicle speed signal. The second pattern memory generates a correction signal determined in correspondence with the vehicle speed signal and the steering angle signal representing a steering angle with respect to a neutral position of a steering wheel. The drive circuit outputs a correction result by correcting the power steering signal by the correction signal.

5 Claims, 4 Drawing Sheets

CONTROL DEVICE FOR POWER STEERING APPARATUS

This is a continuation of application Ser. No. 867,834, filed 5-27-86, now abandoned.

BACKGROUND OF THE INVENTION

The present invention relates to a control device for a power steering apparatus.

A steering force in a vehicle normally decreases when the vehicle speed increases. In a conventional power steering apparatus for giving an auxiliary power corresponding to the steering force, if a small steering force is set at a low vehicle speed, a steering force required at a high vehicle speed is undesirably too small to drive safely at the high speed. Various conventional devices have proposed to decrease a ratio of auxiliary power input to output in response to an increase in vehicle speed. These devices aim at requiring a sufficiently small steering force at the low vehicle speed but not a small steering force at the high vehicle speed.

It is desirable to increase the steering force when the steering angle is increased with respect to the neutral position thereof. It is preferable to increase the steering force when the angle of the steering wheel turned by a driver is increased. This effect is typically preferred during high-speed driving. However, in a conventional power steering apparatus, an increase in steering force upon turning of the steering wheel is small. Strong demand has arisen for improving steering force control from the viewpoint of safety and steering feeling. In particular, the small increase in steering force during high-speed driving upon turning of the steering wheel leads to excess turning and hence a traffic accident. In order to avoid such danger, large steering forces are preset at both high and low vehicle speeds in some conventional power steering control devices. However, the large steering force leads to uncomfortable feeling during continuous steering with small steering angles. High-speed cruising therefore causes easy tiredness of drivers.

SUMMARY OF THE INVENTION

It is a principal object of the present invention to provide a control device for a power steering apparatus, wherein optimal steering forces corresponding to any driving conditions guarantee comfortable, safe driving.

In order to achieve the above object of the present invention, there is provided a control device for a power steering apparatus, comprising: a vehicle speed signal generating circuit for generating a vehicle speed signal corresponding to an actual vehicle speed; a steering angle signal generator for detecting a steering angle and generating a steering angle signal; means for generating a power steering signal determined in correspondence with the vehicle speed signal; means for generating a correction signal determined in correspondence with the vehicle speed signal and the steering angle signal representing a steering angle with respect to a neutral position of a steering wheel; and means for outputting a correction result by correcting the power steering signal by the correction signal.

According to the present invention, the optimal steering force can be obtained by generating a correction signal on the basis of an instantaneous vehicle speed and a steering angle and adding the correction signal to a vehicle speed response designation value.

DESCRIPTION OF THE PREFERRED EMBODIMENT

Figure 1:
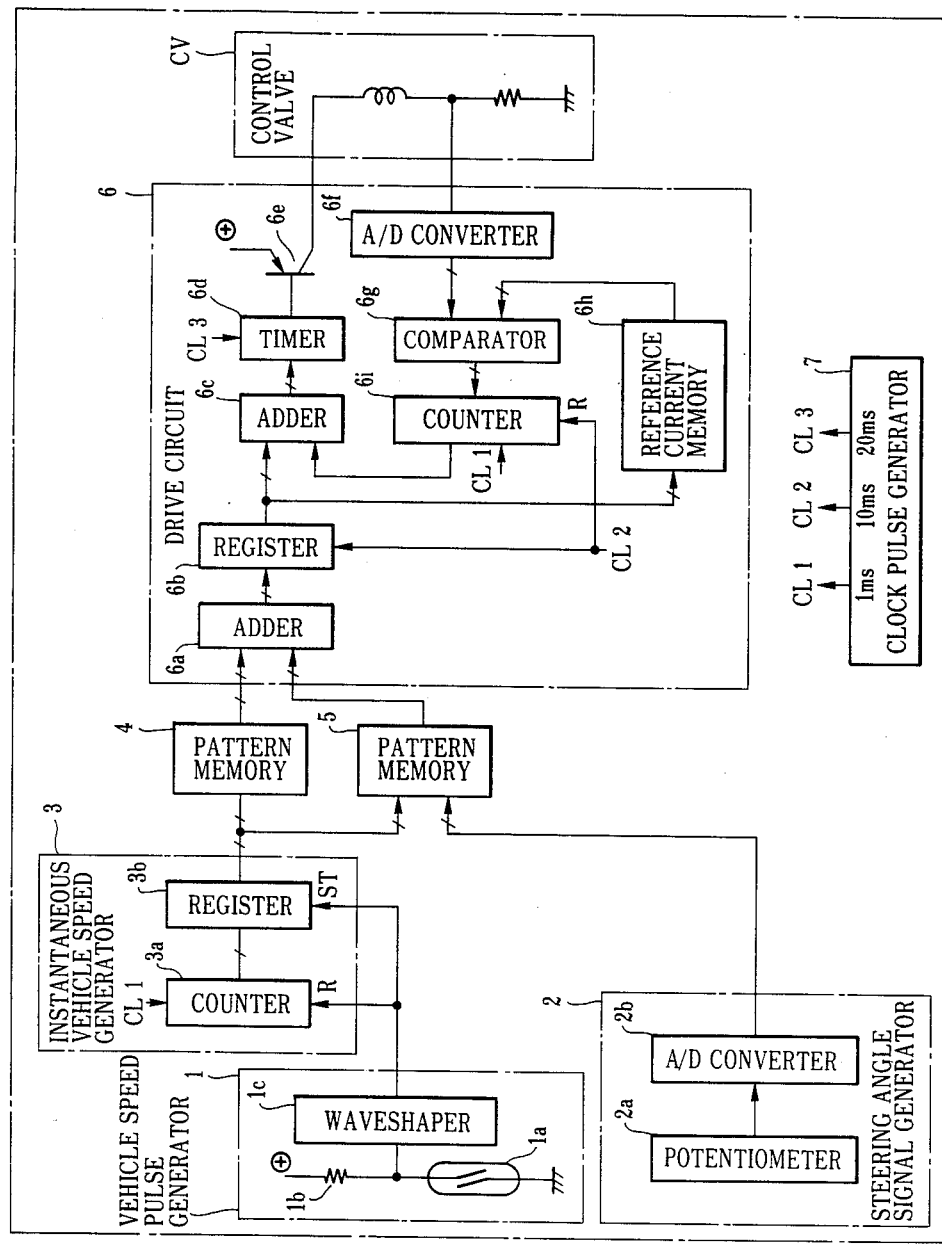
FIG. 1 is a block diagram of a control device for a power steering apparatus according to an embodiment of the present invention.
Figure 2:
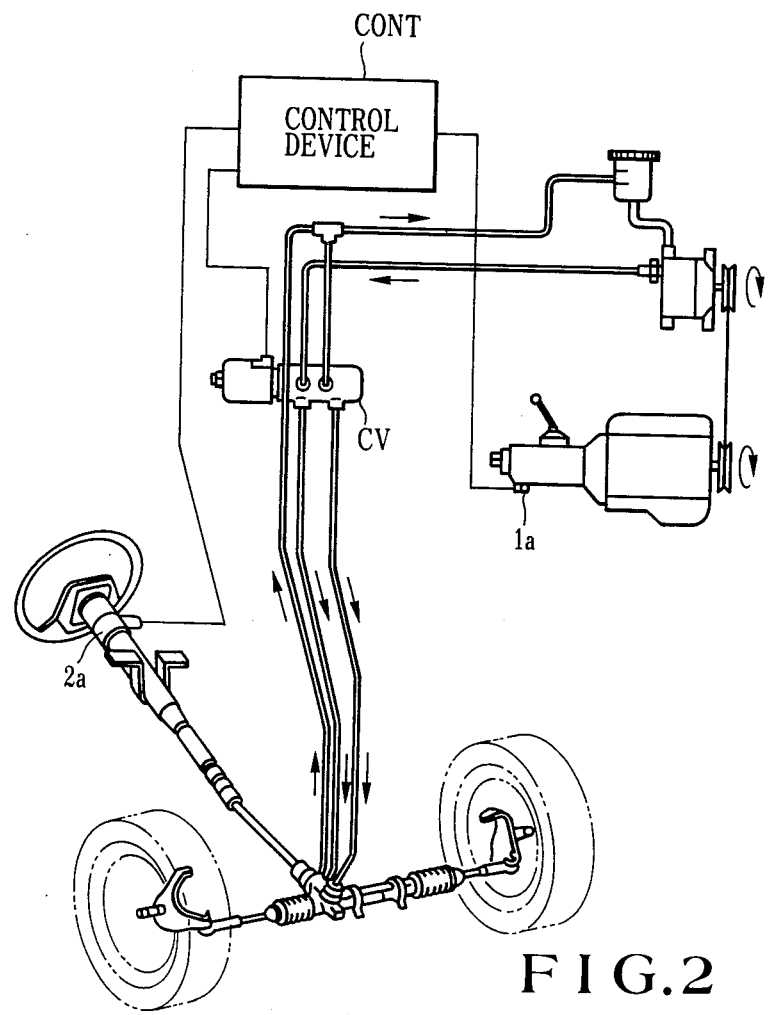
FIG. 2 is a schematic view showing a power steering apparatus controlled by the control device in FIG. 1.

FIG. 1 shows a control device for a power steering apparatus according to an embodiment of the present invention, and FIG. 2 shows a power steering apparatus employing the control device in FIG. 1. In order to best understand the present invention, the overall configuration of the power steering apparatus including the control device as the main feature of this invention will be first described with reference to FIG. 2.

Figure 3:
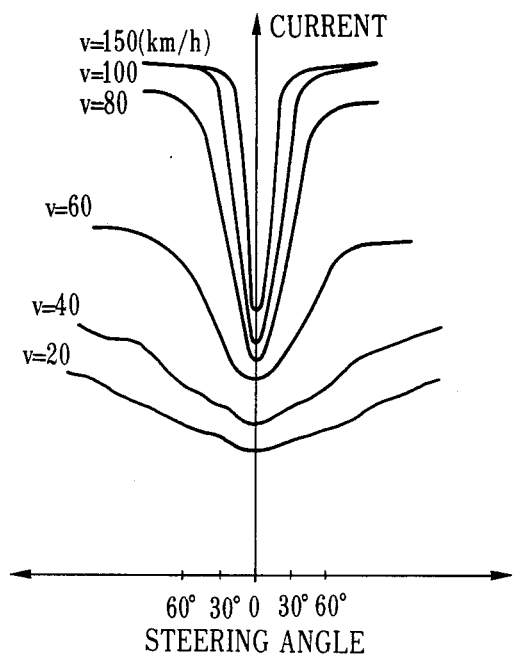
FIG. 3 is a graph showing the steering angle vs. output current characteristics.
Figure 4:
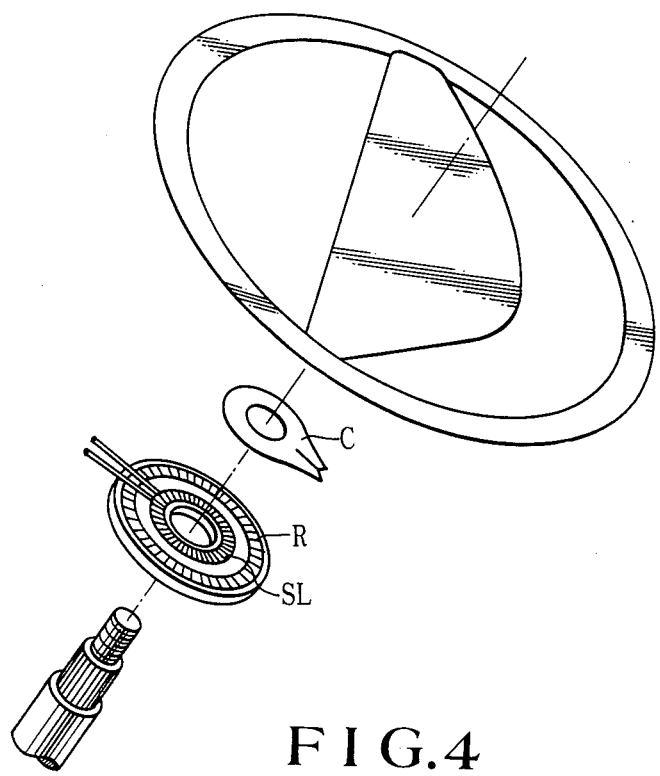
FIG. 4 is an exploded perspective view showing a state where a potentiometer is mounted on a steering wheel.
Figure 5:
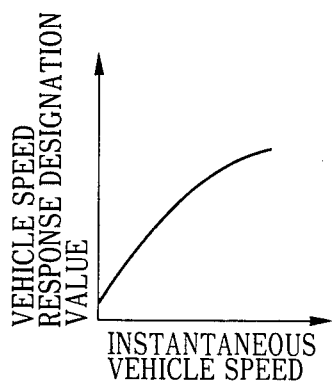
FIG. 5 is a graph showing the characteristics of a pattern memory 4.

Referring to FIG. 2, the power steering apparatus includes a control device CONT in FIG. 1, a control valve CV, a vehicle speed sensor 1a, and a steering sensor 2a for generating a steering angle signal. In the control device CONT, a current i in FIG. 3 is supplied to the control valve CV on the basis of a steering angle signal generated by the steering sensor 2a and a vehicle speed (V) signal from the vehicle speed sensor 1a. The control valve CV controls a steering force in response to the current signal from the control device CONT. The larger the current becomes, the larger the steering force becomes. For this reason, if the vehicle speed is low, the corresponding steering force is small. In addition, the current change corresponding to the change in steering angle is small. The change in steering angle corresponding to the change in steering angle is small. However, when the vehicle speed is increased, the change in steering force corresponding to the change in steering angle is increased. A larger steering force is required at the high vehicle speed than that at the low vehicle speed. The steering force is abruptly increased when the steering angle is increased. Therefore, excess turning of the steering wheel during high-speed driving can be prevented, and the driver can recognize straight driving and obtain comfortable steering feeling.

Control of the characteristics in FIG. 3 by the control device CONT in FIG. 1 will be described below. Referring to FIG. 1, a vehicle speed pulse generator 1 includes a reed switch (i.e., a vehicle speed sensor) 1a, a resistor 1b, and a waveshaper 1c. The reed switch 1a repeats on/off operation upon rotation of a magnet (not shown) mounted on the transmission output shaft. The waveshaper 1c generates short vehicle speed pulses at the off timings of the reed switch 1a. A steering angle signal generator 2 includes a potentiometer 2a as a steering sensor, and an A/D converter for converting an analog signal from the potentiometer 2a to a digital signal representing one of the values (e.g., 0 to 255). The potentiometer 2a includes a main body and a slider C.

The main body consists of a slip ring SL and a resistor R which are mounted on the steering column. The slider C is rotated together with the steering shaft. An instantaneous vehicle speed signal generator 3 includes a counter 3a and a register 3b. The counter 3a counts 1-ms clock pulses CL1 from a clock pulse generator 7. The count of the counter 3a is stored in the register 3b in response to the vehicle speed pulse from the vehicle speed pulse generator 1. The counter 3a is then reset. Therefore, if the vehicle speed is low, the instantaneous vehicle speed signal generator 3 generates a large count and the count data is updated in response to each vehicle speed pulse.

Figure 6:
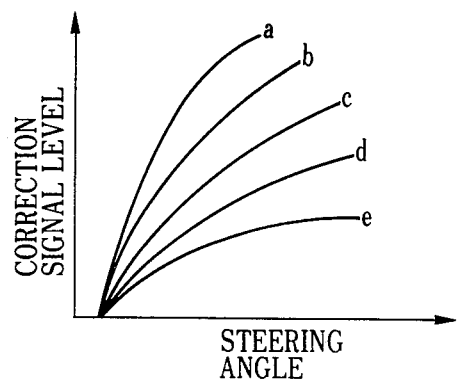
FIG. 6 is a graph showing the characteristics of a pattern memory 5.

A pattern memory 4 stores a vehicle speed response designation value (i.e., a signal for determining a power steering angle at the start of steering) for the instantaneous vehicle speed. A pattern memory 5 stores correction signals for correcting the vehicle speed response designation values, as shown in FIG. 6. Each correction signal is determined by the corresponding instantaneous vehicle speed and the corresponding steering angle. In this case, the steering angle is used as a variable and the instantaneous vehicle speed is used as a parameter. A characteristic curve a in FIG. 6 represents correction values at the maximum vehicle speed; e, correction values at the minimum vehicle speed; and b to d, correction values at the intermediate vehicle speeds.

A drive circuit 6 includes adders 6a and 6c, a register 6b, a timer 6d, a transistor 6e, an A/D converter 6f, a comparator 6g, an up/down counter 6i, and a reference current memory 6h. The timer 6d generates an ON signal having a duration corresponding to that of an output from the adder 6c for every 20 ms of a clock pulse CL3 from the clock pulse generator 7. If the output from the adder 6c is disabled, the transistor 6e is not turned on.

It should be noted that the clock pulse generator 7 generates the 1-, 10-, and 20-ms clock pulses CL1, CL2, and CL3.

The operation of the control device CONT having the above arrangement will now be described. When a vehicle starts to travel, the vehicle speed pulse generator 1 generates a vehicle speed pulse corresponding to the actual vehicle speed. This pulse is processed by the instantaneous vehicle speed signal generator 3 and converted thereby to the instantaneous vehicle speed signal. This signal is supplied to the pattern memory 4. A vehicle speed response designation value corresponding to the input instantaneous vehicle speed signal is read out from the pattern memory 4 and supplied to the adder 6a.

When the driver turns the steering wheel during driving, the steering angle signal generator 2 generates a steering angle signal. The steering angle signal is supplied to the pattern memory 5. Since the pattern memory 5 has received the instantaneous vehicle speed signal from the instantaneous vehicle speed signal generator 3, one of the characteristics represented by the characteristic curves a to e in FIG. 6 is selected. The selected characteristic curve and the steering angle signal determine a correction signal. The correction signal is supplied to the adder 6a.

The selected vehicle speed response designation value from the pattern memory 4 and the selected correction signal from the pattern memory 5 are added by the adder 6a. The sum signal from the adder 6a drives the timer 6d through the register 6b and the adder 6c. The timer 6d generates a signal having a duty ratio corresponding to the input signal. This signal is supplied to the control valve CV through the transistor 6e, thereby performing power steering control.

A current supplied to the control valve CV cannot be constant due to variations in power source voltage and heat from the solenoid. For this reason, the current supplied to the control valve CV is compared by a comparator 6g with a reference value read out from the reference current memory 6h. The comparison result is supplied to the adder 6c through the up/down counter 6i, thereby controlling the current of the control valve CV to be constant.

Figure 7:
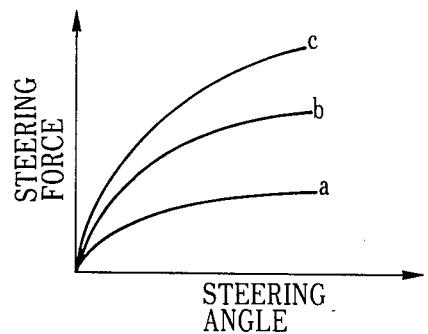
FIG. 7 is a graph for explaining the reason for obtaining the characteristics in FIG. 3.

If the instantaneous vehicle speed is small, the change in steering force corresponding to the change in steering angle is not large, as indicated by a characteristic curve a in FIG. 7. However, when the instantaneous vehicle speed is increased, the steering forces are larger, as indicated by characteristic curves b and c. As shown in FIG. 3, the characteristics representing the relationship between the vehicle speed V, the steering angle, and the steering force (current) are obtained. The "current" here indicates the current supplied to the solenoid for driving the control valve CV. A large current corresponds to a large steering force.

Since the power steering apparatus has the characteristics in FIG. 3, the steering force is decreased near the zero steering angle, thus easily identifying the straight steering position. In addition, when the driver turns the steering wheel at the high vehicle speed, the steering force is abruptly increased, thereby eliminating a dangerous driving state.

According to the present invention as described above, the optimal steering force is determined according to the vehicle speed and the steering angle. Therefore, comfortable, safe steering can be achieved.

What is claimed is:

1. A control device for a power steering apparatus comprising:

a vehicle speed signal generating circuit for generating a vehicle speed signal corresponding to an actual vehicle speed, said vehicle speed signal generating circuit including a vehicle speed pulse generator having a vehicle speed sensor and a waveshaper for generating short vehicle speed pulses at OFF timings of said vehicle speed sensor, and an instantaneous vehicle speed generator including a counter for counting first clock pulses and a register for receiving a count from said counter in response to each vehicle speed pulse from said vehicle speed pulse generator, said instantaneous vehicle speed generator being adapted to generate an instantaneous vehicle speed signal as the vehicle speed signal;

a steering angle signal generator for detecting a steering angle and generating a steering angle signal, said steering angle signal generator including a potentiometer serving as a steering sensor and an analog-to-digital converter for converting an analog signal from said potentiometer to a digital signal representing the steering angle signal;

means for generating a power steering signal determined in correspondence with the vehicle speed signal, said power steering signal generating means including a pattern memory for storing a signal for determining a power steering signal corresponding to the instantaneous speed signal at the start of steering;

means for generating a correction signal determined in correspondence with the vehicle speed signal and the steering angle signal representing a steering angle with respect to a neutral position of a steering wheel; and means for outputting a correction result by correcting the power steering signal by the correction signal.

2. A device according to claim 9, wherein said correction signal generating means comprises a second pattern memory for storing the correction signal for correcting the power steering signal by using the steering angle signal as a variable and the instantaneous speed signal as a parameter.

3. A device according to claim 2, wherein said correction result outputting means includes a first pattern memory and the correction signal from said second pattern memory, a timer operated in response to an output from said first adder and a source of second clock pulses for generating a transistor control signal, and a transistor coupled to said timer for generating the correction result in response to said transistor control signal.

4. A device according to claim 3, wherein said correction result generating means further includes constant current generating means including a reference current memory for storing a reference current value, a comparator for comparing an actual current supplied to a control valve with the reference current value from said reference current memory, and a second adder for receiving a comparison result from said comparator and adding the comparison result and the output from said first adder.

5. A device according to claim 4, wherein the correction result is a sum signal from said first and second adders.

* * * * *